July 23, 1963   W. M. HUSBAND   3,098,672
TURF PLUGGER
Filed Sept. 29, 1960
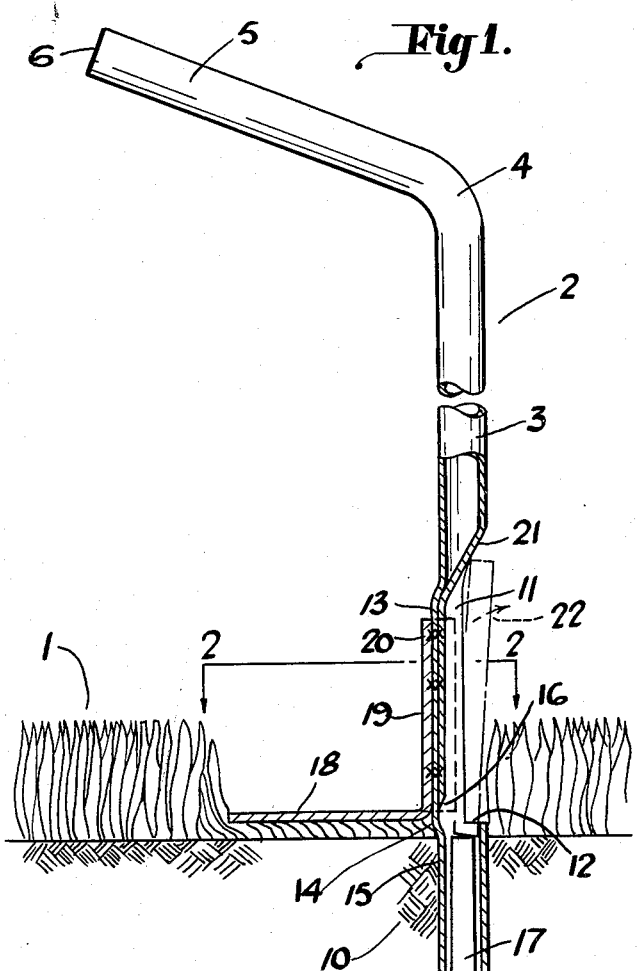
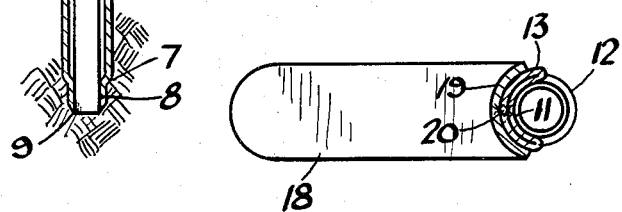
*INVENTOR.*
WILLIAM. M. HUSBAND.
BY
Oberlin, Maky & Donnelly
ATTORNEYS.

2

3,098,672
TURF PLUGGER
William M. Husband, 1904 Wynwood Drive,
Rocky River, Ohio
Filed Sept. 29, 1960, Ser. No. 59,253
4 Claims. (Cl. 294—50.7)

This invention relates, as indicated, generally to a turf plugger and more particularly to a tool which can easily be manufactured which will quickly and simply remove cores or plugs from a turf and the like.

In the manufacture of such turf plugging tools, wooden handles are often required to be secured to plugging tools consisting of several parts, such parts becoming loose with continued use of the tool, thus shortening the working life of such tools. Moreover, the complexity of construction of such tools renders them unduly heavy and more difficult to manipulate in the plugging or aerating of turf and the like.

It is accordingly a principal object of the present invention to provide a simple, easily manufactured turf plugger.

It is another object to provide such a turf plugger which will have a long useful life.

It is still another object to provide a turf plugger which is of light weight, simple construction which can easily be manipulated.

It is a further object to provide a turf plugger which will be efficient in operation, readily and quickly removing cores or plugs from turf and the like.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In said annexed drawing:

FIG. 1 is a fragmentary side elevational view of a turf plugger, partially broken away, constructed in accordance with the present invention; and FIG. 2 is a horizontal sectional view of such turf plugger taken substantially on the line 2—2 of FIG. 1.

Referring now to the annexed drawing and more particularly to FIG. 1, it will be understood that the turf plugging device illustrated is employed to produce holes in lawns or turf as shown at 1, generally for the purpose of aerating the same. The plugging tool 2 is made of a thin walled tubular member 3 with the top of such member being laterally angularly offset or bent as shown at 4 to provide a handle 5. The end 6 of the handle may be slightly beveled or otherwise finished to remove any rough edges. Such offset handle not only facilitates application of a longitudinal force to the shank portion of the tool, but also facilitates twisting such tool about its axis.

Such thin walled tubular member 3 is tapered at its lowered end as shown at 7 and provided with a slightly reduced diameter tip portion 8 having a beveled annular cutting edge 9 facilitating the insertion of the end thereof into the soil 10 of the turf 1. It will thus be seen that the sharp annular cutting edge 9 is of a diameter slightly smaller than the diameter of the main shank portion of the thin walled tubular member 3.

One semi-circular side wall portion 11 of the thin walled tubing member 3 is broken away as shown at 12 and compressed in a single cutting and stamping operation against the opposite wall portion 13 to form a lateral outlet for the removed plug. This opposite wall portion 13 is bowed slightly radially outwardly as shown at 14 so that the inside wall 11 forms a substantially exact tubular continuation of the lower wall portion 15 of the member 3. In such stamping and cutting operation, the lower end of the wall portion 11 may be beveled as shown at 16 to provide a smooth surface permitting the removed plug 17 readily to move therepast.

A horizontal stop member 18 having an upstanding curved portion 19 is spot welded to this double wall thickness of the tubular member 3 as shown at 20. In such spot welding operation, the walls 11, 13 and the upstanding portion 19 of the horizontal stop member 18 will all be welded together thus forming a three wall thickness strongly reinforcing the portion of the thin wall tubular member 3 at which the horizontal stop member 18 is positioned.

The horizontal stop member serves two functions in that it will preclude the device from being inserted into the compressed soil or turf 10 farther than the position shown, the horizontal stop member abutting the grass or surface of the turf. Such horizontal stop member also serves as a foot rest to assist in driving the annular cutting edge 9 into the turf.

It can now be seen that as the annular cutting edge is driven into the turf, the core 17 will be formed and when such plugging tool is removed from the turf, such core will be broken away at the annular cutting edge and removed therewith. When the next hole or opening is to be put into the turf, the previous core or plug 17 will be driven out by the next plug or core to be removed and the top of such core will contact the sloping surface 21 of the wall 11 to be cammed outwardly and thus laterally removed from the plugging tool as shown by the phantom lines and arrow at 22.

Since the thin walled member 3 will preferably be made of a light weight metal, such as aluminum, and since its overall height may be approximately only 34 inches, it can readily be seen that an extremely light weight and simplified device is provided. The thin walled tubular member will preferably be 16 gauge and approximately ½ inch in diameter. The length of the horizontal portion 18 of the stop member need be no more than 2 inches thus adding insignificantly to the weight of the device.

All that is required to manufacture the present turf plugger is the initial length of tubing which is bent as shown at 4; cut and compressed as shown at 11 and 12; reduced in diameter as shown at 8; and has the horizontal stop 18 welded thereto as shown at 20. Such a simplified construction of a turf plugger, of course, enables such implement to be more easily manufactured and accordingly sold at a substantially reduced price.

Other modes of applying the principles of the invention may be employed, change being made as regards the details described, provided the features stated in any of the following claims or the equivalent of such be employed.

I, therefore, particularly point out and distinctly claim as my invention:

1. A turf plugger comprising a thin walled tubular member having an upper laterally bent portion forming a handle, a reduced diameter annular cutting edge at the lower end thereof adapted to penetrate such turf to produce a plug, one side portion of the wall of said tubular member spaced upwardly from said edge being cut and stamped and thus compressed against the opposite wall thereof to form on one side of said tubular member a vertically elongated lateral outlet opening for such plug and on the opposite side a semi-circular vertically elongated circumferentially continuous double thickness wall portion, and a horizontal stop member firmly secured to the thus produced double wall thickness of said tubular member.

2. A turf plugger as set forth in claim 1 wherein said horizontal stop member includes a vertically extending portion which is welded to the double thickness wall portion of said tubular member to form a three wall reinforcing portion.

3. A turf plugger as set forth in claim 2 wherein the opposite wall of said tubular member is bowed slightly outwardly so that the inner wall of the double thickness wall portion of said tubular member forms a tubular continuation of the lower portion of said tubular member.

4. The turf plugger set forth in claim 1 wherein said wall portions are welded together.

References Cited in the file of this patent

UNITED STATES PATENTS

| | | |
|---|---|---|
| 177,444 | Widney | May 16, 1876 |
| 828,452 | Barry | Aug. 14, 1906 |
| 2,439,524 | Moore | Apr. 13, 1948 |
| 2,708,593 | Benoist | May 17, 1955 |

FOREIGN PATENTS

| | | |
|---|---|---|
| 107,002 | Australia | of 1939 |
| 711 | Great Britain | Jan. 11, 1910 |
| 127,864 | Sweden | of 1950 |